(12) United States Patent
Zhao

(10) Patent No.: US 9,294,293 B2
(45) Date of Patent: Mar. 22, 2016

(54) VIRTUAL CONTACT CARDS

(71) Applicant: eBay Inc., San Jose, CA (US)

(72) Inventor: Lucy Ma Zhao, Austin, TX (US)

(73) Assignee: PAYPAL, INC., San Jose, CA (US)

( * ) Notice: Subject to any disclaimer, the term of this patent is extended or adjusted under 35 U.S.C. 154(b) by 201 days.

(21) Appl. No.: 13/687,980

(22) Filed: Nov. 28, 2012

(65) Prior Publication Data

US 2014/0149518 A1 May 29, 2014

(51) Int. Cl.
*G06F 15/16* (2006.01)
*G06Q 30/00* (2012.01)
*H04L 12/18* (2006.01)
*G06F 15/167* (2006.01)
*H04M 3/42* (2006.01)
*H04L 12/58* (2006.01)

(52) U.S. Cl.
CPC ............ *H04L 12/1859* (2013.01); *H04L 51/32* (2013.01); *H04L 51/22* (2013.01)

(58) Field of Classification Search
CPC ..... H04L 12/1859; H04L 51/00; H04L 51/22; H04L 51/32
See application file for complete search history.

(56) References Cited

U.S. PATENT DOCUMENTS

| 2002/0124188 A1* | 9/2002 | Sherman ................ G06Q 10/10 726/6 |
| 2008/0065974 A1* | 3/2008 | Campbell ...................... 715/200 |
| 2011/0119133 A1* | 5/2011 | Igelman et al. ............ 705/14.58 |
| 2013/0217365 A1* | 8/2013 | Ramnani ............... H04L 67/306 455/414.1 |

OTHER PUBLICATIONS

Microsoft, "Best Practices for Microsoft Office Outlook 2007," 2007.*
Microsoft, "Setting Up Your E-mail in Microsoft Outlook," 2003.*

* cited by examiner

*Primary Examiner* — Wen-Tai Lin
(74) *Attorney, Agent, or Firm* — Haynes and Boone, LLP

(57) ABSTRACT

A service provider receives from a user who has an account with it contact card information and recipient information picture information, therefrom determines a virtual contact card and contact channels through which the virtual contact card is sent to the recipients designated by the user, and sends the virtual contact card to the designated recipients through the contact channels. The virtual contact card and contact channels may be selected from what have been previously registered, either by the user or a third person, with the service provider and stored in the user's account, or just newly created, updated, and sent from the user at the time of transmission request to the designated recipients. The virtual contact card, when updated by the user, may be automatically sent by the service provider to the same recipients that previously received a pre-updated version.

24 Claims, 3 Drawing Sheets

VIRTUAL CONTACT CARDS

BACKGROUND

1. Field of the Invention

The present invention generally relates to communicating and sharing information via virtual contact cards implemented by assistance of a payment provider.

2. Related Art

People in modern days are living with a flood of information. In our daily lives, we constantly create, search for, receive, send, relay, review and evaluate information. There are many occasions we wish to share, sometimes on a daily basis, with others like friends, family members, customers or clients, or other groups with specific interests, particular information that we either created for commercial or personal purposes, received from other people, or found, for instance, on the Internet. If you are a merchant, for example, you may wish to frequently convey to your customers on a regular basis or update with them various information on your products, services, a new store opening, new location, hours, directions, or daily specials or promotions, along with some multimedia files such as the pictures of sales items, or clips of advertisement. If you are a member of book club, you may wish to share with other club members your new feelings, findings, or questions you had while or after reading a particular book.

Therefore, for situations when one needs to frequently or regularly send to other people, or update with them, specific information, there is a need to provide a means by which the newly created or updated information can be automatically conveyed to the recipients desired by a sender or updated on the local copies on their personal devices so that the sender need not go through all the trouble of figuring out or searching for contact channels of recipients and then personally sending the information to them whenever the sender newly creates or updates information.

DETAILED DESCRIPTION

Figure 1:
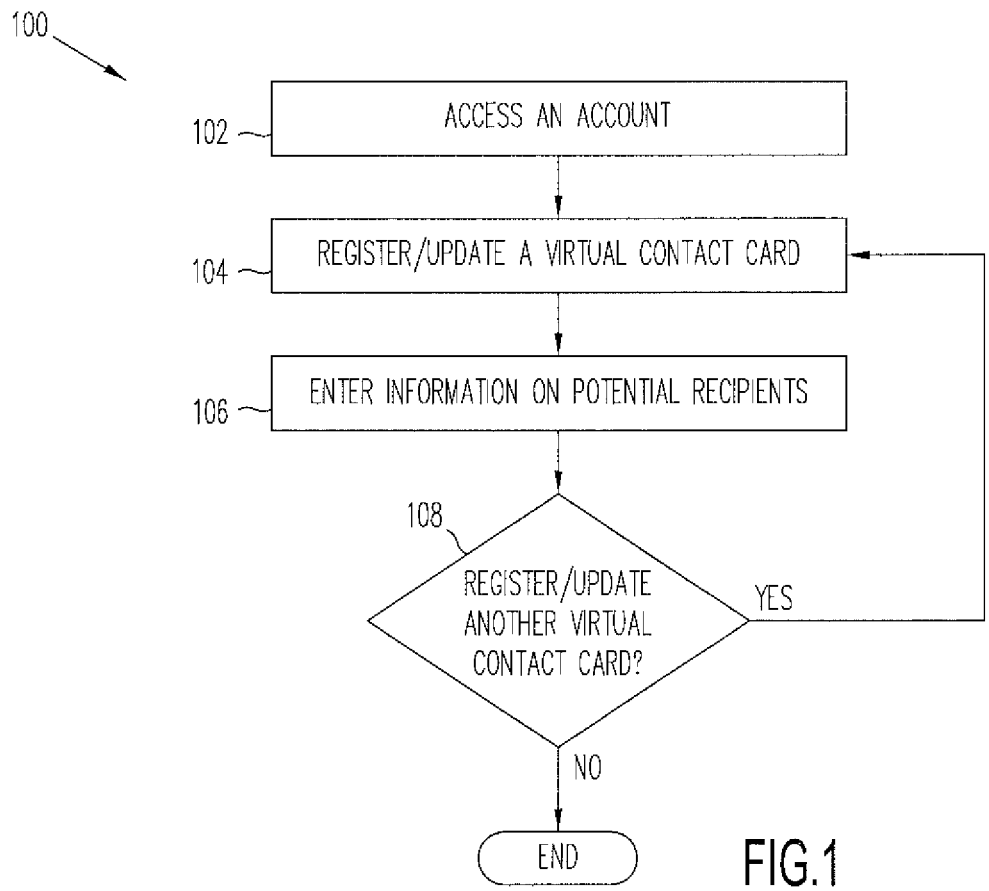
FIG. 1 is a flowchart showing a process a user, who has an account with a service or payment provider, performs in setting up or updating virtual contact cards and contact information of potential recipients of the contact cards in an user's account, according to one embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

A virtual contact card, described in the present disclosure, is a digital card, which may contain any information the creator desires to electronically convey to recipients. For example, if the creator is a merchant, it may contain store information such as store logos, marks, store hours, location, directions, maps, phone numbers, emails, web links, or contact channels for social network services such as Twitter, Facebook, Skype, etc. The virtual contact card may also include product/service information such as product/service catalogues, descriptions, prices, special promotions or sales information, coupons, QR codes, customers' feedbacks, evaluations or survey results, comparisons with competitors' products or services, and/or the merchant's recommendations. In one embodiment, the virtual contact cards may include website links directing the recipients to sites of merchants on their user devices, where more information on any related products or services from the same merchants, or invitation to consumers to open an account with the merchants may be found. In another embodiment, the contact cards may even include mobile APPs or html5 APPs, which would be automatically loaded and run on the user device of the recipients.

A virtual contact card may be comprised of texts, numbers, designs, pictures, photos, music files, moving clips, or any other multimedia features, which would be automatically displayed or played on the user device of the recipients via one or more suitable client applications. Further, the virtual contact card may have a tab or link on it to lead the recipient, when clicked on, to other content or information. For instance, in a basic screen of a virtual contact card loaded on the recipient's user device, there may be a tab or link named, for instance, 'new store information' or 'daily special.' This way of designing the contact cards with sub-menus would enable the creator to easily update only a relevant portion of a contact card, for instance, the 'daily special' section, without having to redesign the entire virtual card. In this respect, the virtual contact cards may not necessarily consist of a single digital file, but may comprise multiple files, all of which may be sent as a single virtual contact card.

The virtual contact card may also be created and used, not only for a commercial purpose, but also for any personal purpose. For instance, if people find places such as commercial or individual websites, personal blogs, or physical sites, which they would like to introduce or recommend to their family or friends, virtual contact cards may be created containing all the desired information about the places. Or, if one wishes to share one's daily comments, meditations, or summaries on news, stock trends, religious devotions, recollections, book reviews, movie or music reviews, or whatever subjects and issues with a group of people having a common interest, virtual contact cards containing those daily inputs may be created and sent to that group.

Once created, the virtual contact cards may be set up or registered by the creator with a service or payment provider, such as PayPal, Inc. of San Jose, Calif., with whom the creator has an account. The registration may be done by transmitting the virtual contact cards to the service or payment provider from a user device, which may be a merchant's server, a PC, a mobile phone, a tablet, an iPad™, an iPod™, or any other suitable device that has a suitable client application developed either by the service or payment provider or by a third party. The service or payment provider may then store the registered contact cards in a memory of a server and associate them with the user's account of the registrant, along with other user information needed for subsequent transmission to potential recipients designated by the creator/user. Further, the virtual contact cards may be modified or updated whenever needed by the creator/user or any other rightful user through an access to the user's account from a user device.

FIG. 1 is a flowchart showing a process 100 a user performs in setting up or updating virtual contact cards and contact information of potential recipients in an account with a service or payment provider, according to one embodiment. The user has an account with the service or payment provider such as PayPal, Inc. of San Jose, Calif., and may be either a merchant such as a manufacturer, distributor, or retailor, who created or designed the virtual contact cards for commercial or business purposes, or a consumer or any individual who designed the cards for various personal purposes. Especially when the process 100 is practiced for updating/modifying a pre-existing virtual contact card, the user may be a recipient who received the virtual contact card on her or his account from another user who may have created the card.

At step 102, the user accesses an account with the service or payment provider from a user device, such as a merchant server, PC, tablet, or other suitable devices. Accessing the account may include entering any requested identification and/or authentication information, such as a user name, email address, name, phone number, password, PIN, pass code, etc., into a field via a device keyboard or keypad, or speaking an identifier into a device microphone. Once the user has been authenticated, the user may be directed to a home page of the payment provider or a user account.

After authentication, the user may register, or update a virtual contact card(s) with the user's account at step 104. On the home page, there may be options to register a new virtual contact card or modify a pre-registered virtual contact card. The options may be presented as a tab, button, or link on the screen of the user device, and the user may tap or click on them through a touch screen or mouse of the user device to initiate the registration or modification of the virtual contact card.

In one embodiment, the virtual contact card may be created at a user device using any suitable local application, which might have been installed in the user device either by the payment provider or by a third party. In an embodiment, tapping or clicking on the tab, button, or link may pop up a window that may request the user to upload the virtual contact card that has been already created by browsing through the user device. In another embodiment, the virtual contact card may be created, at the time of registration, either locally via a user application or online via a server provided program loaded the user device, according to a pre-determined template or format.

Similarly, when there is a need to update a pre-registered virtual contact card, a user tapping or clicking on a tab, button, or link may pop up the list of pre-registered virtual contact cards on the screen of the user device for the user to choose from. During editing/updating the selected card, again using a suitable local or online application, the user may import any files, such as pictures, music files, clips, or any alphanumeric texts into the virtual contact card being edited. The finished virtual contact card, which is to be registered with the server, may be in any publicly known format.

Once having finished registering a virtual contact card, the user may be asked, at step 106, to enter information on potential recipients of the card. On the page, there may be an option to create or modify/update a list of potential recipients and register information for contacting them. If the user selects this option, such as by tapping or clicking on a tab, button, or link on the user device through a touch screen or mouse, the user may be provided with fields and/or instructions to enter/modify information about potential recipients. Examples of requested information may include, but are not limited to, an identifier of each potential recipient, accounts of any social network services each potential recipient subscribes to, and any restrictions that the payment provider should comply with in transmitting the particular contact card being registered to each potential recipient. The identifier can be a name, an email address, a mobile phone number, or any other information that identifies the potential recipient. The type of identifiers may be specified by the payment provider in an embodiment. The user may enter the identifiers in different ways, including through a user contact or address book on the user device, through a user's social network, through manually entering the identifier onto a field via a device keyboard or keypad, or speaking the identifier into a device microphone.

After entering an identifier(s) for a particular potential recipient, the user may be asked to enter or modify information on contact channels through which the payment provider may transmit the virtual contact card. The contact channels may be emails, any accounts of the potential recipient has with a service/payment provider, and/or accounts of social network services the potential recipient subscribes to. Examples of the social network services include, but are not limited to, Facebook, tweet (or Twitter), LinkedIn, Google+, or other SMSs (small message systems) or text-based systems.

Further, at step 106, the user may be asked to add/modify any restrictions or options in transmitting, by the payment provider, the virtual contact card to a particular potential recipient. For examples, the user may be asked to determine: when the virtual contact card should be sent to the recipient(s), e.g., right after completing the registration process or any later time appointed by the user; whether the virtual contact should be automatically sent to the recipients, if it is modified or updated, to the same recipients that the pre-updated version has been sent to or it should be sent only at the user's separate instruction; or how many different contact channels the contact card has to be sent to, if multiple contact channels have been registered for a particular recipient, and if only one channel is to be used, what would be the preferred order, etc. The types of restrictions and options in a given potential recipient may be preset and provided by the program running on the user device in one embodiment, or the user may create/add entirely new restrictions/options in another embodiment.

At each step, the user can view the information entered or uploaded, and when no more information is to be added, the user is notified to confirm or modify, if desired, any information or uploaded material. Note that one or more of the steps in any process described herein can be combined with one or more steps, omitted, and/or performed in a different sequence.

Once all the information about potential recipients for a particular virtual contact card is confirmed by the user, then at step 108, the user is given a choice to register/modify another virtual contact card. If the user chooses to register another card, the user may repeat the step 104. If the user wishes to create a different list of potential recipients for the added virtual contact card, the user may repeat the step 106. When the user finishes registering/updating all virtual contact card(s) and all list(s) of potential recipients, the data may be stored in a memory of a server and associated or linked with the user account on the payment provider. Moreover, the user may be asked whether the user wishes to send any of the registered/updated virtual contact cards to selected recipients right away. If the user wishes to do so, the user may have the payment provider transmit the selected virtual contact card(s) right away via the process 200 to be described with FIG. 2 herein.

Figure 2:
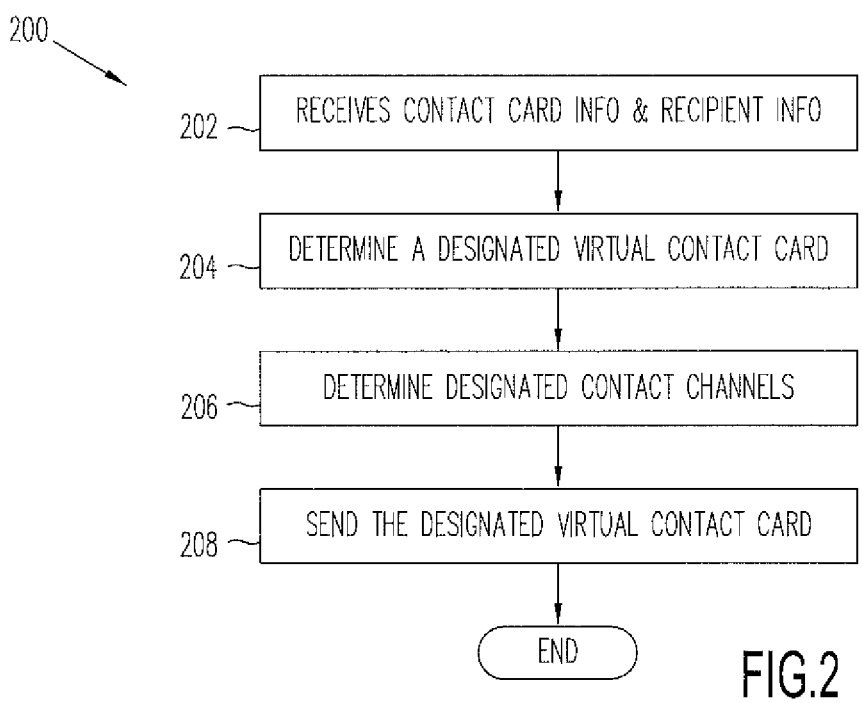
FIG. 2 is a flowchart showing a process a service or payment provider performs in sending a virtual contact card to a recipient designated by a user, who has an account with the payment provider, according to one embodiment.

FIG. 2 is a flowchart showing a process 200 a service or payment provider, such as PayPal, Inc. of San Jose, Calif., performs, according to one embodiment, in sending a designated virtual contact card to a designated recipient at a user's request, who has an account with the payment provider.

At step 202, the payment provider receives from a user through a user device, contact card information and recipient information. In the present disclosure, there are several different embodiments for implementing the process 200 depending on whether the user who makes a transmission request by sending the contact card information and recipient information is a creator/registrant of the contact card, and whether the contact card information and recipient information utilizes a pre-registered information.

In one embodiment, the user may be the creator or designer of the virtual contact card, who could be either a merchant who designed the card for business purposes, or a consumer or individual who designed the card for personal purposes. In either case, at step 202, the user first accesses her or his account from a user device, such as via a user application installed therein. The user device may be any device that has a capability of wireless communication with the payment provider via a user application. If the user is a merchant, the user device may be a merchant server or a PC. If the user is a consumer or an individual, the user device could be a server, a PC, a mobile phone, a tablet, iPad™, iPod™, etc. The user application on the user device may be developed either by the payment provider or by a third party. Accessing the account may include entering any requested identification and/or authentication information into a filed provided by the user application as described herein at the step 102 of the process 100.

After authentication, the user sends, i.e., electronically transmits wiredly or wirelessly at step 202, contact card information to the payment provider via a suitable user application on the user device. In one embodiment, there may be already one or more virtual contact card(s) that have been pre-registered or previously updated with the service provider by the user, according to the process 100 described in FIG. 1. The cards may have been already stored in a memory of the server of the service provider and included in the user's account information. First, there may be on the user application a tab or button saying, for instance, "My Contact Cards," and under it, another tab or button saying, "Send Contact Card" or "Share Contact Card." If the user selects it, the user application may provide a button, tab, or link to open a list of the pre-registered virtual contact cards for the user to select. When the user selects a particular contact card out of the list shown on the screen on the user device by tapping or clicking on the button, tab, or link on the list, the user application may pop up another window asking whether the user wishes to transmit the selected contact card as it is, or update/edit it before transmission. If the user chooses, for example, 'transmission as is,' the identifying information of the selected virtual contact card will be transmitted, at step 202, from the user device to the service provider as the contact card information. If the user chooses to edit/update the selected virtual contact card, the user application may load the selected virtual card on an editor program of the user device, either an editor integrated into the user application or an externally imported one, for the user to edit. In another embodiment, the user may be given an option to upload a ready-made virtual contact card from the user device to replace the selected existing contact card. Upon completion of editing/updating the selected virtual contact card, the user application may ask for confirmation on whether the user wishes to send the updated virtual contact card. The user tapping or clicking on, for example, a 'confirm' tab or button on the user application will send the entire contents of the newly and locally updated virtual contact card to the service provider as the contact card information at step 202.

In another embodiment, when there is no pre-registered virtual contact card with the payment provider, the user may be provided, after user authentication, with an option to newly create or upload one or more virtual contact cards for immediate transmission to the recipients designated by the user. Then, the user may create or upload a new contact card, according to the process 100 described herein. When the user confirms completion by tapping or clicking on, for example, a 'confirm' tab or button, the user application will send all information of the newly created virtual contact card, including its content, to the service provider as the contact card information at step 202. The user may be further given an option to register the newly created contact card with the service provider and have it associated with her or his account.

In still another embodiment, the user need not be the designer or creator of a virtual contact card, but may be the one who received one in the past. The virtual contact card may have been sent from a merchant, friend, family, or some other person who created it to the account of the user with a service provider and saved in the user's account information. At times, the user may wish to send the virtual contact card saved in her or his account to another person(s). Then, the user may perform the same step 202 to do that. The user may access the account with the service provider from a user device, authenticate her or his account, load a list of virtual contact cards received and associated with the user's account, if there are multiple ones, and select a desired virtual card out of the list to have it transmitted to a desired recipient(s). The information of the selected virtual contact card, including the content, will be transmitted from the user device to the service provider as the contact card information.

After selecting a particular virtual contact card, at the same step 202, the user may be then asked to enter information on one or more recipients of the selected virtual card, recipient information. In one embodiment, when the user is the designer/registrant of the selected virtual contact card, the user may have already created and registered with the service provider one or more lists of potential recipients, in accordance with the process 100 described herein. Each list may include information on contact channels and/or any restrictions/options that the server should comply with in transmitting the particular registered contact card. Such information may have been already associated with the user's account or included in the user's account information. The list may have been also updated by the user after initial registration with adding or dropping recipients, or changing the contact channels or restrictions in accordance with the process 100. In this case, tapping or clicking on a tab in the user application may open the list of potential recipients saved in the service provider on the user device for the user to select. The user may be able to select one or more recipients, one by one, from the list by clicking on the names on the list, and then the identifiers of the selected recipients may be transmitted from the user device to the service provider as the recipient information.

In another embodiment, the user may not need to choose specific recipients one by one out of a list of potential recipients registered with the payment provider. There may be a pre-determined list of recipients for a specific contact card and the respective contact channels pre-registered with the payment provider. This case may happen especially when the user updates a pre-registered contact card, which had been sent to a group of recipients at least once previously, and whose information has been saved by the payment provider. When the user confirms completion of updating one, the user may be given a choice between approving transmitting the updated contact card to the same group of recipients who received the pre-updated version, and whose info nation had been stored with the payment provider, and editing the list of recipients before transmission. In the user chooses the former, the user's tapping or clicking on, for instance, an 'approval' tab or button would constitute sending the payment provider recipient information that the recipients for the particular selected contact card are the same group of recipients who received the pre-updated version.

In still another embodiment, when there is no pre-registered list of potential recipients with the service provider, the user may be provided with an option to create or upload a list of recipients for the selected contact card. The user may be asked to enter the name, contact channels in the preferred order, and any restrictions such as described herein, in a field provided by the user application. All data entered by the user about the new recipients will be then transmitted to the payment provider as the recipient information for the particular selected contact card. This new data may be optionally registered with the payment provider, and associated with the user's account.

Once the user selects the recipients to send the virtual contact card by the service provider, then at the same step 202, the user may be further asked by the user application to update or newly create, if desired, various restrictions on transmitting the selected contact card, which may have been included in the user's account information. The restrictions may include the user's choices on, for instance, whether the selected virtual contact card should be sent to the selected recipients right away or at a later time to be decided by the user, or whether the selected contact card should be sent to all enlisted contact channels, or if not, what would be the preferred order of contact channels to transmit the selected card over in case the most preferred one does not work. Further, the restrictions may include the user's choice on whether the virtual contact should be automatically sent, if it is modified or updated, to the same recipients that the pre-updated version has been sent to, or the updated version should be sent only at the user's separate instruction on that.

If the user wishes to change any of the pre-registered restrictions, the user may follow the steps of the process 100 described herein. For instance, if the user changes his pre-registered choice of 'right away transmission' to 'a later time transmission,' the user may be asked to enter the desired date and time on a window popped up.

Now at step 204, the payment provider determines, from the contact card information received from the user, a designated virtual contact card to transmit to the recipients designated by the user. In one embodiment, the user selects, on the user application on the user device, a specific virtual contact card from a list of pre-registered/updated contact cards, stored in the server of the payment provider. Then, transmission of the selection to the payment provider constitutes transmission of contact card information. Upon receiving the contact card information that necessarily contains the identity of the selected card, the payment provider is able to readily determine the virtual contact card designated by the user for instant transmission by searching among the pre-registered one or more virtual contact cards saved in its server.

In another embodiment, the user may create/upload a new contact card or edit/update a pre-registered contact cards at the user device. At completion, all information and contents of the newly created or updated virtual contact card are transmitted to the payment provider as contact card information, upon which the payment provider can readily determine the virtual contact card designated by the user for instant transmission, and additionally, may save it in its server for further transmissions in the future at the user's request.

At step 206, the payment provider now determines, from the recipient information received from the user, one or more designated contact channels over which to send the designated virtual contact card. In an embodiment where the user selects specific recipients one by one out of a pre-registered list of potential recipients, the recipient information transmitted from the user device to the payment provider necessarily contains the identifiers of the selected recipient(s). Upon receiving the recipient information, the payment provider then is able to readily determine the designated contact channels to send the designated contact card by consulting the list of potential recipients and the contact channels for each potential recipient included in the user's account information.

In another embodiment where the user selects an entire group of recipients for sending the designated contact card to by selecting a preexisting list shown on the screen of the user device, which is usually the case when the user updates a pre-registered contact card and chooses to send the updated contact card to the same group of people who previously received the pre-updated version, the recipient information the payment provider receives simply comprises the user's such decision to utilize the pre-determined recipients and their respective contact channels. Upon receipt of such recipient information, the payment provider can readily determine the designated contact channels by referring to the designated preexisting list of former recipients and their contact channels stored in its server.

In still another embodiment, when there is no pre-registered list of potential recipients with the service provider, and the user enters the name(s) of desired recipients and their contact channels in the preferred order on the user application, all data entered by the user about the desired recipients is transmitted from the user to the payment provider as the recipient information. The payment provider then can immediately determine the designated contact channels from the recipient information it received, because the recipient information itself contains the information on contact channels to send the designated contact card.

Finally at step 208, the payment provider sends, or electronically transmits, the designated virtual contact card to one or more recipients desired by the first user via the one or more designated contact channels that have been determined at step 206. The designated contact channels may be entails, accounts with a service/payment provider, and/or accounts of social network services the recipients subscribes to. Examples of the social network services include, but are not limited to, Facebook, tweet (or twitter), LinkedIn, Google+, or other SMSs (small message systems).

If the designated virtual contact card is transmitted to the designated contact channels, it may be readily accessed and viewed by the recipients on their respective user devices. In an embodiment, the virtual contact card may be edited and stored by the recipients, and/or resent to another recipient. Further, once a new virtual contact card is received or a previously received contact card is updated over the contact channels, the recipients may be immediately notified of its arrival or update by, for instance, a window popped up on the user device, and be able to view it by simply clicking on a tab or link on the pop up window.

Figure 3:
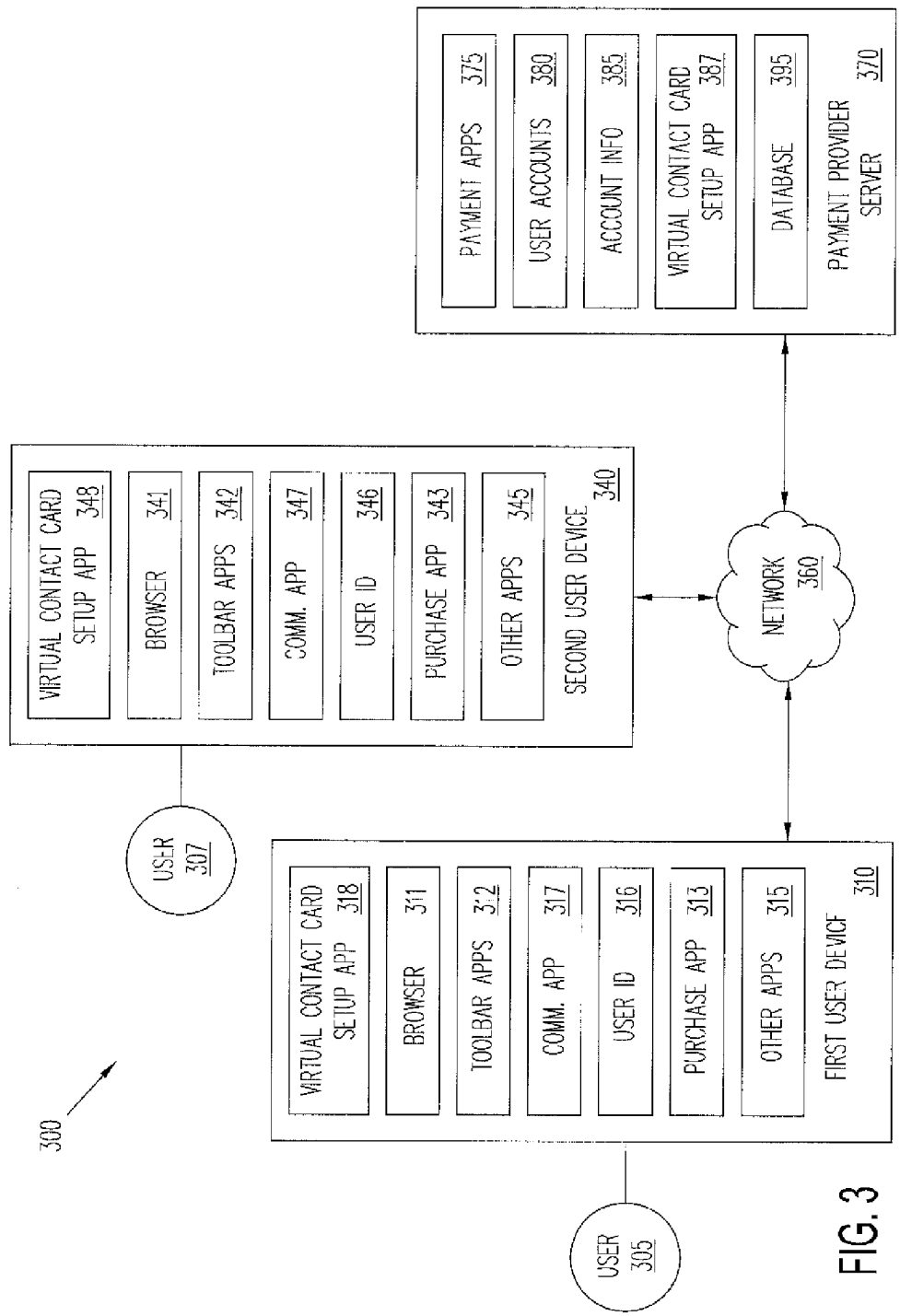
FIG. 3 is block diagram of a networked system suitable for implementing the process described herein according to one embodiment.

FIG. 3 is a block diagram of a networked system 300 configured to handle a process, such as described above, in accordance with an embodiment of the invention. System 300 includes first and second user devices 310 and 340 used by a first user 305 and a second user or a recipient 307, respectively, and a payment provider server 370 in communication over a network 360. Payment provider server 370 may be maintained by a payment provider, such as PayPal, Inc. of San Jose, Calif. The users 305 and 307, such as buyers, consumers, or merchants, utilize user devices 310 and 340 to perform transactions relating transmission of a virtual contact card using payment provider server 370. Note that transaction, as used herein, refers to any suitable action performed using the user device, including transfer of information or file(s), display of information, or editing files, etc. Although only one recipient device 340 is shown, a plurality of recipient devices may be utilized if the first user is transmitting a virtual card to multiple recipients.

The first and second user devices 310, 340, and payment provider server 370 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 300, and/or accessible over network 360.

Network 360 may be implemented as a single network or a combination of multiple networks. For example, in various embodiments, network 360 may include the Internet or one or more intranets, landline networks, wireless networks, and/or other appropriate types of networks.

User devices 310 and 340 may be implemented using any appropriate hardware and software configured for wired and/or wireless communication over network 360. For example, in one embodiment, the user devices may be implemented as a merchant server, a personal computer (PC), a smart phone, personal digital assistant (PDA), laptop computer, tablet, and/or other types of computing devices capable of transmitting and/or receiving data, wired or wireless, such as an iPad™ from Apple™.

User device 310 may include one or more browser applications 311, which may be used, for example, to provide a convenient interface to permit user 305 to browse information available over network 360. For example, in one embodiment, browser application 311 may be implemented as a web browser configured to view information available over the Internet, and/or access merchant sites for viewing and purchasing commercial products. User device 310 may also include one or more toolbar application 312, which may be used, for example, to provide client-side processing for performing desired tasks in response to operations selected by user 305. In one embodiment, toolbar application may display user interfaces in connection with browser application 311 as further described herein.

User device may further include purchase application by which the user 305 may transmit purchase requests to the payment provider server 370. The purchase application 313 may be incorporated into the browser 311 in one embodiment such that it may enable the user 305 directly to make a purchase request from a merchant's website loaded via the browser 311. Further, the purchase application 313 may have scanning functions to scan, through a scanner in the user device 310, pictures, photos, QR codes, or virtual contact cards designed by others at offline or online stores, to create/design or edit her or his own contact cards, and transmit it to the payment provider server 370 via network 360.

User device 310 may further include other applications 315 as may be desired in particular embodiments to provide desired features to user device 310. For example, other applications 315 may include, respectively, security applications for implementing client-side security features, programmatic client applications for interfacing with appropriate application programming interfaces (APIs) over network 360, or other types of applications. Applications 315 may also include email, texting, voice and IM applications that allow user 305 to send and receive emails, calls, and texts through network 360, as well as applications that enable the user 305 to communicate, transfer information, upload files, and make payments. User device 310 includes one or more user identifiers 316 which may be implemented, for example, as operating system registry entries, cookies associated with browser application 311, identifiers associated with hardware of user device 310, or other appropriate identifiers, such as used for payment/user/device authentication. In one embodiment, user identifier 316 may be used by a payment service provider to associate user 305 with a particular account maintained by the payment provider as further described herein. A communications application 317, with associated interfaces, enables user device 310 to communicate within system 300.

Further, the user device 310 may further include a virtual contact card set up application 318 for the purpose of providing the service of transmitting a request, with other necessary data to the payment provider 370, to register/edit/update virtual contact cards and various contact channels of potential recipients and/or restrictions/options to be associated an account of the user with the payment provider 370. The application 318 is connected to a memory or storage of the user device 310 to upload images and/or other files stored therein.

The second user device 340 is used by another user 307, who could be any individual including a merchant or seller, or a consumer. The second user device 340 has basically the same elements or applications with the first user device 310, including a browser 341, a toolbar application 342, a purchase application 343, other applications 345 such as security applications and programmatic client applications for interfacing with network 360, and email, texting, voice and IM applications, user identifier 346, communication application 347, and a virtual contact card set up application 348.

Payment provider server 370 also maintains a plurality of user or merchant accounts 380, each of which may include account information 385 associated with individual users, including list of potential recipients of virtual contact cards created by the user 305. For example, account information 385 may include private financial information of users of devices such as account numbers, passwords, device identifiers, user names, phone numbers, credit card information, bank information, or other financial information, and shipping information which may be used to facilitate online transactions by user 305. Account information may also include an identifier of the potential recipients, one or more virtual contact cards, contact channels of each recipient, and one or more restrictions/options in transmitting the contact cards, all registered by the user 305.

Payment provider server 370 may further include a virtual contact card application 387 for receiving and transmitting virtual cards from the user 305, which is associated with the user's account information 385. The virtual contact card set up application 387 receives from the user 305 via the user device 310, contact card information and recipient information, determines a designated virtual contact card from the contact card information, while comparing it with the registered virtual contact cards stored in a data base 395, determine one or more designated contact channels matching from the recipient information, while comparing it with the list and contact channels of the potential recipients stored in a data base 395, and send the designated virtual contact card to one or more recipients desired by the first user 305 via the one or more contact channels.

Payment provider server 370 may further provide payment between user 305 and a merchant server. In this regard, payment provider server 370 includes one or more payment applications 375 which may be configured to interact with user device 310 and/or merchant server over network 360 to facilitate the purchase of goods or services, communicate/display information, and send payments by user 305 of user device 310.

Figure 4:
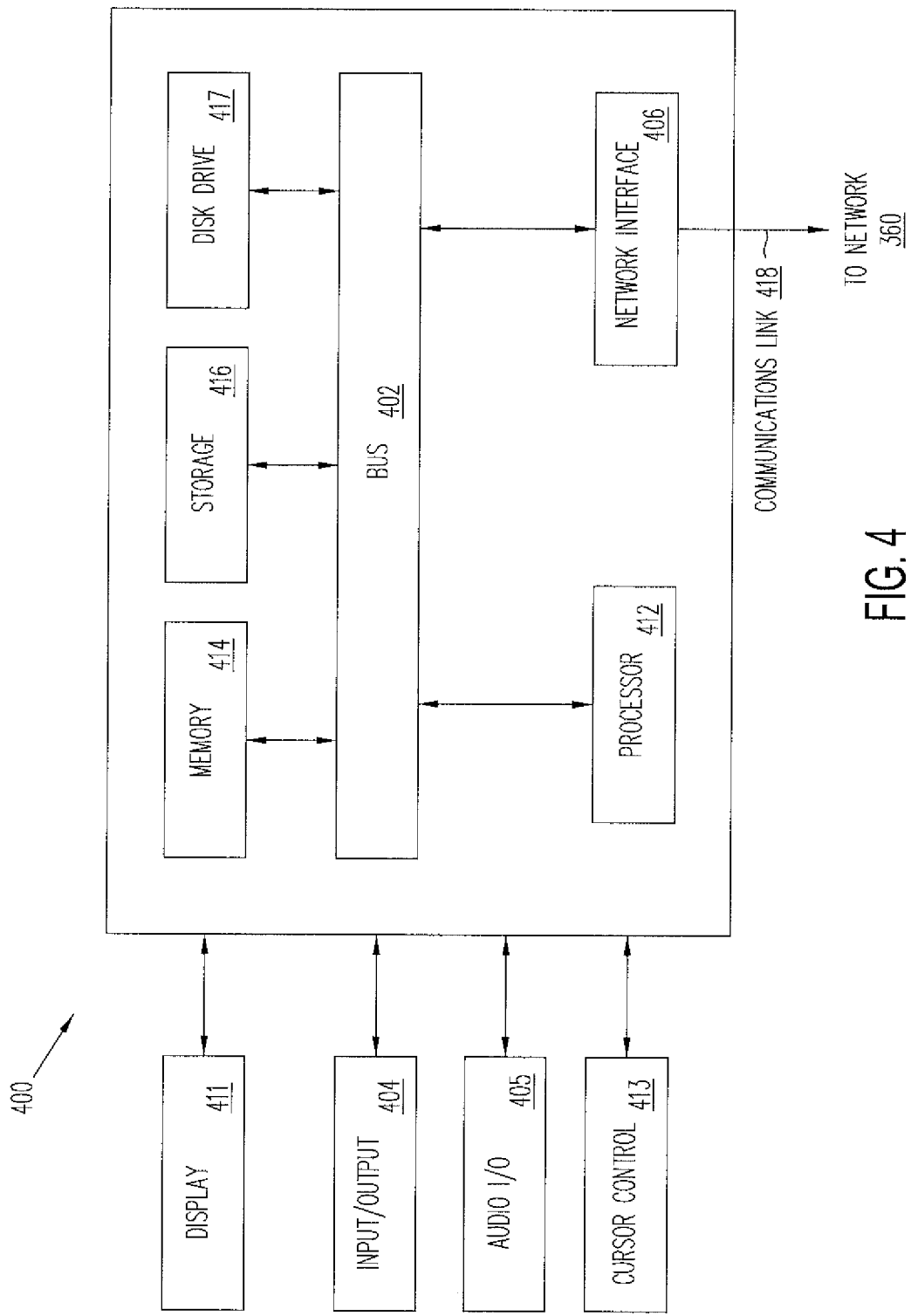
FIG. 4 is a block diagram of a computer system suitable for implementing one or more components in FIG. 3 according to one embodiment.

FIG. 4 is a block diagram of a computer system 400 suitable for implementing one or more embodiments of the present disclosure. In various implementations, the user device may comprise a personal computing device (e.g., smart phone, a computing tablet, a personal computer, laptop, PDA, Bluetooth device, key FOB, badge, etc.) capable of communicating with the network. The merchant and/or payment provider may utilize a network computing device (e.g., a network server) capable of communicating with the network. It should be appreciated that each of the devices utilized by users, merchants, and payment providers may be implemented as computer system 400 in a manner as follows.

Computer system 400 includes a bus 402 or other communication mechanism for communicating information data, signals, and information between various components of computer system 400. Components include an input/output (I/O) component 404 that processes a user action, such as selecting keys from a keypad/keyboard, selecting one or more buttons or links, etc., and sends a corresponding signal to bus 402. I/O component 404 may also include an output component, such as a display 411 and a cursor control 613 (such as a keyboard, keypad, mouse, etc.). An optional audio input/output component 405 may also be included to allow a user to use voice for inputting information by converting audio signals. Audio I/O component 405 may allow the user to hear audio. A transceiver or network interface 406 transmits and receives signals between computer system 400 and other devices, such as another user device, a merchant server, or a payment provider server via network 360. In one embodiment, the transmission is wireless, although other transmission mediums and methods may also be suitable. A processor 412, which can be a micro-controller, digital signal processor (DSP), or other processing component, processes these various signals, such as for display on computer system 400 or transmission to other devices via a communication link 418. Processor 412 may also control transmission of information, such as cookies or IP addresses, to other devices.

Components of computer system 400 also include a system memory component 414 (e.g., RAM), a static storage component 416 (e.g., ROM), and/or a disk drive 417. Computer system 400 performs specific operations by processor 412 and other components by executing one or more sequences of instructions contained in system memory component 414. Logic may be encoded in a computer readable medium, which may refer to any medium that participates in providing instructions to processor 412 for execution. Such a medium may take many forms, including but not limited to, non-volatile media, volatile media, and transmission media. In various implementations, non-volatile media includes optical or magnetic disks, volatile media includes dynamic memory, such as system memory component 414, and transmission media includes coaxial cables, copper wire, and fiber optics, including wires that comprise bus 402. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 400. In various other embodiments of the present disclosure, a plurality of computer systems 400 coupled by communication link 418 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system comprising:
  a non-transitory memory storing one or more merchant virtual contact cards associated with one or more respective merchants; and
  one or more hardware processors coupled to the non-transitory memory and configured to read instructions from the non-transitory memory to cause the system to perform operations comprising:
    receiving, from a first user through a user device, contact card information designating one of the merchant virtual contact cards associated with a merchant and recipient information designating one or more recipients;

determining, from the contact card information, the designated merchant virtual contact card by searching among the one or more merchant virtual contact cards in the non-transitory memory for the designated merchant virtual contact card;

determining, from the recipient information, one or more designated contact channels of the one or more designated recipients;

sending the designated merchant virtual contact card to be stored as local copies on one or more user devices of the one or more designated recipients via the one or more designated contact channels;

automatically updating, via a client application, the local copies of the designated merchant virtual contact card on the one or more user devices by sending only a modified portion of the designated merchant virtual contact card via at least one contact channel selected from a plurality of contact channels according to restrictions established for each recipient of the merchant virtual contact card when registering with a service provider, the restrictions including specific time and order of preferred contact channels to send the modified portion of the designated merchant virtual contact card; and providing, via the client application, a notification on the one or more user devices in response to the merchant providing promotional or sale information via the designated merchant virtual contact card.

2. The system of claim 1, wherein the one or more merchant virtual contact cards are created, registered, or updated with the system by the first user.

3. The system of claim 1, wherein the updating is in response to the merchant updating the designated merchant virtual contact card stored in the non-transitory memory.

4. The system of claim 1, wherein the one or more merchant virtual contact cards are sent by one or more different users.

5. The system of claim 1, wherein the one or more merchant virtual contact cards are updated by one or more different users.

6. The system of claim 1, wherein the at least one contact channel comprises the one or more designated contact channels.

7. The system of claim 1, wherein the recipient information includes one or more identifiers associated with the one or more designated contact channels.

8. The system of claim 1, wherein the user device is a smart phone.

9. A method comprising:

accessing, in a memory of a service provider, one or more merchant virtual contact cards associated with one or more respective merchants;

receiving from a first user through the user device, by one or more processors of the service provider, contact card information designating one of the merchant virtual contact cards associated with a merchant and recipient information designating one or more recipients;

determining from the contact card information, by the one or more processors, the designated merchant virtual contact card by searching among the one or more merchant virtual contact cards in the memory for the designated merchant virtual contact card;

determining from the recipient information, by the one or more processors, one or more designated contact channels of the one or more designated recipients;

sending, by the one or more processors, the designated merchant virtual contact card to be stored as local copies on one or more user devices of the one or more designated recipients via the one or more designated contact channels;

automatically updating, by the one or more processors via the client application, the local copies of the designated merchant virtual contact cards on the one or more user devices by sending only a modified portion of the designated merchant virtual contact card via at least one contact channel selected from a plurality of contact channels according to restrictions established for each recipient of the merchant virtual contact card when registering with the service provider, the restrictions including specific time and order of preferred contact channels to send the modified portion of the designated merchant virtual contact card; and providing, by the one or more processors via the client application, a notification on the one or more user devices in response to the merchant providing promotional or sale information via the designated merchant virtual contact card.

10. The method of claim 9, wherein the one or more merchant virtual contact cards are created, registered, or updated with the service provider by the first user.

11. The method of claim 9, wherein the updating is in response to the merchant updating the designated merchant virtual contact card in the memory.

12. The method of claim 9, wherein the one or more merchant virtual contact cards are sent by one or more different users.

13. The method of claim 9, wherein the one or more merchant virtual contact cards are updated by one or more different users.

14. The method of claim 9, wherein the at least one contact channel comprises the one or more designated contact channels.

15. The method of claim 9, wherein the recipient information includes one or more identifiers associated with the one or more designated contact channels.

16. The method of claim 9, wherein the user device is a smart phone.

17. A non-transitory machine-readable medium having stored thereon machine-readable instructions executable to cause a machine to perform operations comprising:

accessing, in a memory, one or more merchant virtual contact cards associated with one or more respective merchants;

receiving, from a first user through a user device, contact card information designating one of the merchant virtual contact cards associated with a merchant and recipient information designating one or more recipients;

determining, from the contact card information, the designated merchant virtual contact card by searching among the one or more merchant virtual contact cards in the memory for the designated merchant virtual contact card;

determining, from the recipient information, one or more designated contact channels of the one or more designated recipients;

sending the designated merchant virtual contact card to be stored as local copies by a client application on one or more user devices of the one or more designated recipients via the one or more designated contact channels;

automatically updating, via the client application, the local copies of the designated merchant virtual contact card on the one or more user devices by sending only a modified portion of the designated merchant virtual contact card via at least one contact channel selected from a plurality of contact channels according to restrictions established for each recipient of the merchant virtual contact card when registering with the service provider, the restrictions including specific time and order of preferred contact channels to send the modified portion of the designated merchant virtual contact card; and providing, via the client application, a notification on the one or more user devices in response to the merchant providing promotional or sale information via the designated merchant virtual contact card.

18. The non-transitory machine-readable medium of claim 17, wherein the one or more merchant virtual contact cards are created, registered, or updated with the service provider by the first user.

19. The non-transitory machine-readable medium of claim 17, wherein the updating is in response to the merchant updating the designated merchant virtual contact card stored in the memory.

20. The non-transitory machine-readable medium of claim 17, wherein the one or more merchant virtual contact cards are sent by one or more different users.

21. The non-transitory machine-readable medium of claim 17, wherein the one or more merchant virtual contact cards are updated by one or more different users.

22. The non-transitory machine-readable medium of claim 17, wherein the at least one contact channel comprises the one or more designated contact channels.

23. The non-transitory machine-readable medium of claim 17, wherein the recipient information includes one or more identifiers associated with the one or more designated contact channels.

24. The non-transitory machine-readable medium of claim 17, wherein the user device is a smart phone.

* * * * *